US006567909B2

(12) United States Patent
Tsuruta et al.

(10) Patent No.: US 6,567,909 B2
(45) Date of Patent: May 20, 2003

(54) PARALLEL PROCESSOR SYSTEM

(75) Inventors: Toru Tsuruta, Kawasaki (JP); Yuji Nomura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/847,397

(22) Filed: May 3, 2001

(65) Prior Publication Data
US 2001/0054124 A1 Dec. 20, 2001

Related U.S. Application Data

(63) Continuation of application No. PCT/JP98/05054, filed on Nov. 10, 1998.

(51) Int. Cl.$^7$ ................................ G06F 15/16
(52) U.S. Cl. ............................ 712/15; 712/11
(58) Field of Search ........................ 712/15, 11

(56) References Cited

U.S. PATENT DOCUMENTS

| 5,535,373 A | * | 7/1996 | Olnowich ............... 370/466 |
| 5,590,284 A | * | 12/1996 | Crosetto ................ 710/104 |
| 5,841,967 A | * | 11/1998 | Sample et al. ........... 714/33 |
| 5,935,256 A | * | 8/1999 | Lesmeister .............. 713/400 |

FOREIGN PATENT DOCUMENTS

| JP | 59-60683 | 4/1984 |
| JP | 63-6656 | 1/1988 |
| JP | 5-502958 | 5/1993 |

OTHER PUBLICATIONS

Tamitani, Ichiro et al., "A Real-Time Video Signal Processor Suitable for Motion Picture Coding Applications", IEEE Transactions on Circuits and Systems, Oct. 1989, vol. 36. No. 10.

* cited by examiner

Primary Examiner—Eric Coleman
(74) Attorney, Agent, or Firm—Staas & Halsey LLP

(57) ABSTRACT

A parallel processor system is constructed to include a pair of parallel buses (2, 3), pipeline buses (9), a plurality of processor nodes (1-1 to 1-N) having functions of carrying out an operation process in response to an instruction and transferring data, cluster switches (5-1 to 5-N, 6-1 to 6-N, 7-1a to 7-La, 7-1b to 7-+b, 8-1a to 8-Ma, 8-1b to 8-(M-1)b) having a plurality of connection modes and controlling connections of the parallel buses, the pipeline buses and the processor nodes, and a switch controller (4) controlling the connection mode of the cluster switches and coupling the processor nodes in series and/or in parallel.

24 Claims, 15 Drawing Sheets

PROCESSOR NODE

FOR PARALLEL BUS

FOR PIPELINE BUS

PARALLEL PROCESSOR SYSTEM

This application is a continuing application, filed under 35 U.S.C. §111(a), of International Application PCT/JP98/05054, filed Nov. 10, 1998.

TECHNICAL FIELD

The present invention generally relates to parallel processor systems, and more particularly to a parallel processor system which is suited for constructing a mutual connection network which carries out encoding of audio and image data and signal processing on computer graphics and the like.

BACKGROUND ART

With respect to the processor system, there are demands to carry out the signal processing at a high speed and economically. One method of satisfying such demands is to improve the processor performance. However, when this method is employed and the processor performance exceeds a certain threshold value, the costs of hardware and development greatly increase as compared to the improvement of the processor performance. For this reason, in order to realize an extremely high-speed processor, it is necessary to balance various tradeoffs. For example, the improvement of the silicon technology reduces the micron rule to enable reduction of the chip size and reduced power consumption, but the restrictions on signal synchronization and propagation delay become severe such that the time and effort required for the design become extremely large.

On the other hand, as another method of improving the performance of the processor system, there is a method which employs a parallel processor system structure. In the parallel processor system, two or more processors are connected in parallel. In this case, by using a plurality of processors which at least have certain speeds, it is possible to distribute the load among the plurality of usable processors. For example, when a single processor system which is formed by a single processor and a parallel processor system which is formed by a plurality of similar processors are compared, the parallel processor system cannot simply carry out twice the number of processes that can be processed by the single processor system, but the parallel processor system can process more processes in parallel per unit time as compared to the single processor system. In other words, when carrying out the same amount of processes per unit time, the parallel processor system can effectively utilize a more economical processor technology compared to the single processor system. In addition, the parallel processor system has an advantage in that the system scale can be modified by adjusting the number of processors depending on the application environment.

However, in the parallel processor system, it is necessary to realize a cooperative process among the processors by constructing a mutual connection network among the processors. The structure of this mutual connection network is important, because the performance of the entire parallel processor system becomes close to "(processing performance of a unit processor)×(number of processors)" or, "less than or equal to the processing performance of a unit processor" in a worst case, depending on this structure.

Conventionally, there are various connection formats for the mutual connection network, including a total connection type shown in FIG. 1, a parallel bus type shown in FIG. 2, a ring type shown in FIG. 3, a mesh type shown in FIG. 4, and an n-cube type shown in FIG. 5, for example. When these connection formats for the mutual connection network are categorized generally by function, each connection format is formed by processor nodes PN each having a processor and a communication link, communication paths CP for making communication, and cluster switches CS each connecting three or more communication paths CP.

Next, conditions for making a bandwidth between each two processor nodes PN become equal to W, that is, conditions for making a bandwidth of the communication path CP between the processor node PN and the cluster switch CS become equal to (P−1)×W, where P denotes the number of processor nodes PN, will be compared for the total connection type, the parallel bus type and the ring type connection formats shown in FIGS. 1 through 3.

First, performances of the communication paths CP of these connection formats will be compared. In the case of the total connection type connection format shown in FIG. 1, since an independent communication path CP connects between each two processor nodes PN, the bandwidth of each communication path CP becomes equal to W. In the case of the parallel bus type connection format shown in FIG. 2, because each two processor nodes PN are connected via a common communication path CP, the bandwidth of the common communication path CP becomes equal to P×W. Further, in the case of the ring type connection format shown in FIG. 3, when the bandwidths of the communication paths CP between non-adjacent processor nodes PN are averaged, the bandwidth of each communication path CP becomes equal to (P−1)×W. Accordingly, the total connection type connection format is more economical than the other two, in that a low-performance communication path CP can be used.

On the other hand, with regard to the structure of the cluster switch CS is observed, only the bandwidth (P−1)×W needs to be controlled in the case of the total connection type connection format, but a bandwidth larger than (P−1)×W needs to be controlled in the case of the parallel bus type and the ring type connection formats because a communication between the non-adjacent processor nodes PN and passing through the cluster switch CS is also generated. However, when the number of communication paths CP connected to the cluster switch CS is observed, the number is three in the case of the parallel bus type and the ring type connection formats regardless of the number of processor nodes PN, while the number is P in the case of the total connection type connection format. For this reason, in the case of the total connection type connection format, the structure of the cluster switch CS becomes more complex as the number of processor nodes PN of the parallel processor system increases, and it becomes difficult to realize the structure for a large number of processor nodes PN, both costwise and technically.

Therefore, the total connection type connection format is superior when the number of processor nodes PN of the parallel processor system is small, but the structures of the parallel bus type and the ring type connection formats become more advantageous technically as the number of processor nodes PN increases.

In the case of the parallel bus type and the ring type connection formats, however, the distance between the processor nodes PN, that is, the number of passing cluster switches CS, becomes a problem as the number of processor nodes PN of the parallel processor system increases. In the case of the total connection type connection format, the number of passing cluster switches CS is two regardless of the number of processor nodes PN. But in the case of the parallel bus type connection format, the number of passing cluster switches CS is equal to the number of P of processor nodes PN for a maximum path. Further, in the case of the ring type connection format, the number of passing cluster switches CS is equal to INT(P/2+1) for a maximum path, where INT denotes an integer value obtained by ignoring fractions. Moreover, although a communication delay may be estimated to be a fixed delay in the case of the total connection type connection format, the communication delay is not fixed in the case of the parallel bus type and the ring type connection formats and this communication delay may greatly affect the performance of the entire parallel processor system.

Hence, as the number of processors of the parallel processor system increases, it is not always possible to construct an efficient mutual connection network using the total connection type, the parallel bus type or the ring type connection format.

The mesh type connection format shown in FIG. 4 and the n-cube type connection format shown in FIG. 5 have been proposed to solve the above described problems. In the case of the mesh type and the n-cube type connection formats, the connections respectively are two-dimensional and three-dimensional, and the increase in the distance between the processor nodes PN as the number of processor nodes PN of the parallel processor system increases is small compared to the parallel bus type and the ring type connection formats described above. However, the distance between the processor nodes PN still increases as the number of processor nodes PN of the parallel processor system increases, and for a large number of processor nodes PN, there was a problem in that it is impossible to realize an optimum structure for the entire parallel processor system, both costwise and technically.

DISCLOSURE OF THE INVENTION

Accordingly, it is a general object of the present invention to provide a novel and useful parallel processor system in which the problems described above are eliminated.

Another and more specific object of the present invention is to provide a parallel processor system having a mutual connection network with an optimum connection format, both costwise and technically.

Still another object of the present invention is to provide a parallel processor system comprising a pair of parallel buses, pipeline buses, a plurality of processor nodes having functions of carrying out an operation process in response to an instruction and transferring data, cluster switches having a plurality of connection modes and controlling connections of the parallel buses, the pipeline buses and the processor nodes, and a switch controller controlling the connection mode of the cluster switches and coupling the processor nodes in series and/or in parallel. According to the parallel processor system of the present invention, it is possible to provide a parallel processor system having a mutual connection network with an optimum connection format, both costwise and technically.

Other objects and further features of the present invention will be apparent from the following detailed description when read in conjunction with the accompanying drawings.

BEST MODE OF CARRYING OUT THE INVENTION

Figure 1:
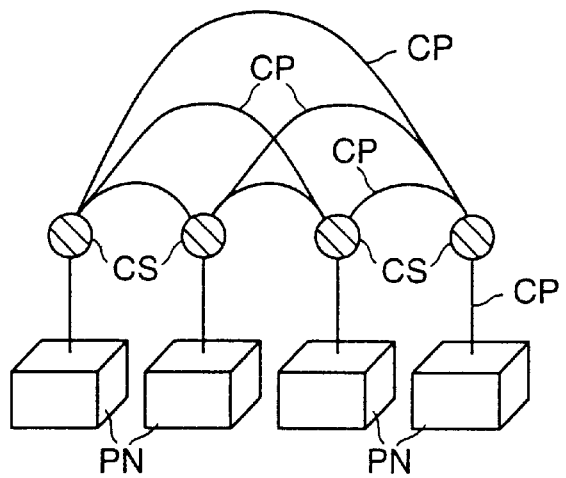
FIG. 1 is a diagram for explaining a total connection type connection format.
Figure 2:
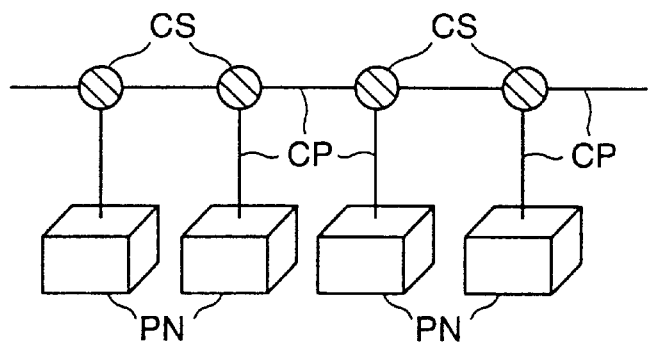
FIG. 2 is a diagram for explaining a parallel bus type connection format.
Figure 3:
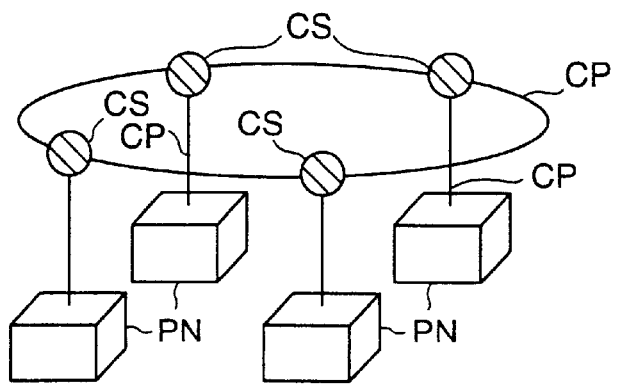
FIG. 3 is a diagram for explaining a ring type connection format.
Figure 4:
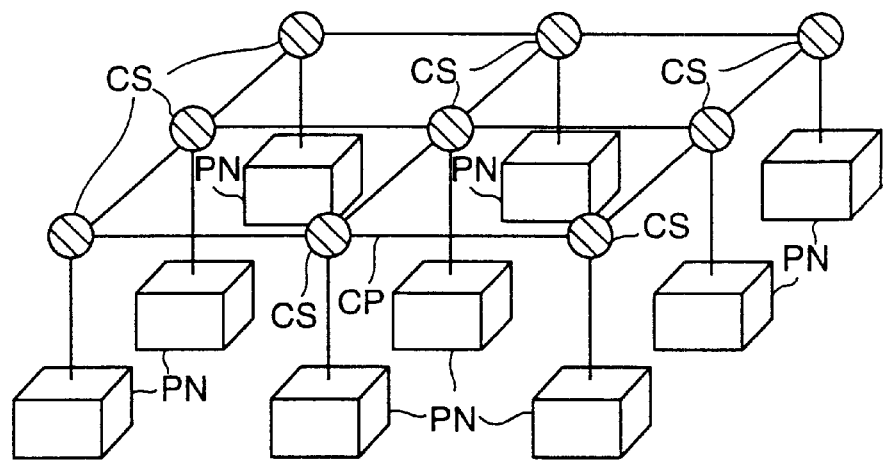
FIG. 4 is a diagram for explaining a mesh type connection format.
Figure 5:
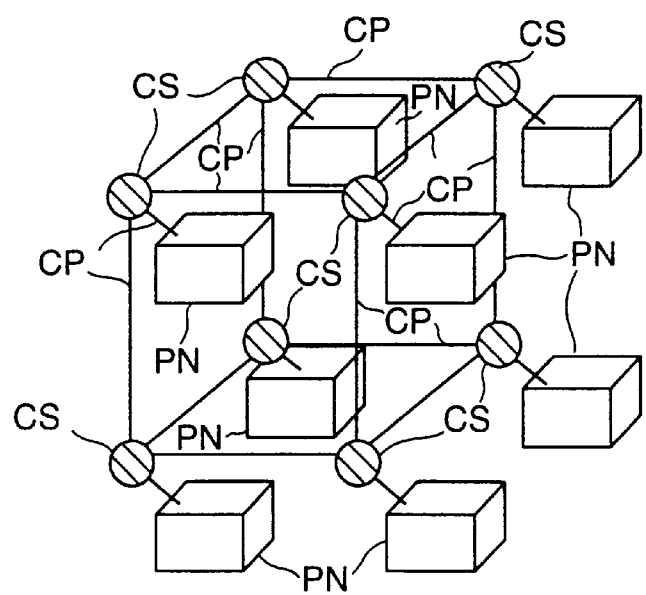
FIG. 5 is a diagram for explaining an n-cube type connection format.
Figure 6:
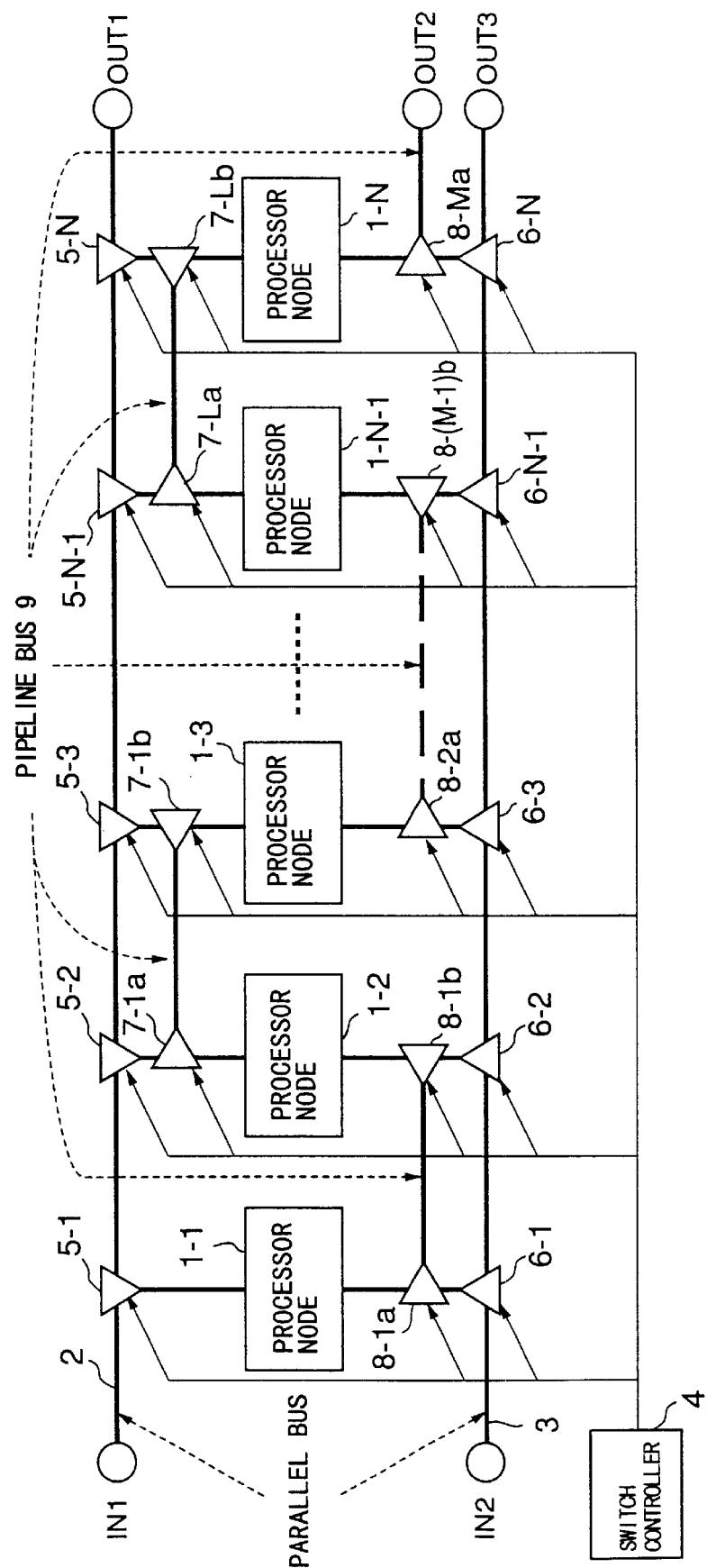
FIG. 6 is a diagram showing an embodiment of a parallel processor system according to the present invention.

FIG. 6 is a diagram showing an embodiment of a parallel processor system according to the present invention. This embodiment of the parallel processor system generally includes processor nodes 1-1 through 1-N, parallel buses 2 and 3, a switch controller 4, cluster switches 5-1 through 5-N, 6-1 through 6-N, 7-1a through 7-La, 7-1b through 7-Lb, 8-1a through 8-Ma and 8-1b through 8-(M−1)b, and a plurality of pipeline buses 9 which are connected as shown in FIG. 6.

Figure 7:
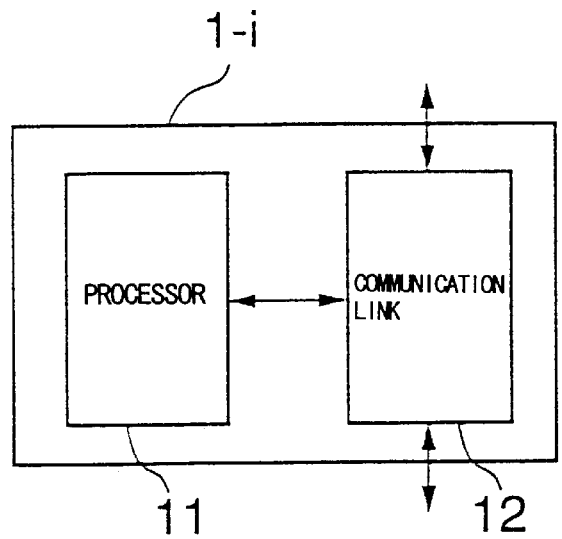
FIG. 7 is a diagram showing a structure of a processor node.

Each of the processor nodes 1-1 through 1-N has the same structure shown in FIG. 7. A processor node 1-i includes a processor 11 and a bidirectional communication link 12 which are connected as shown in FIG. 7, where i=1 to N. The processor 11 carries out operation processes according to various instructions and the communication link 12 transfers data in response to a request from the processor 11. As will be described later, the processor nodes 1-1 through 1-N are mutually connected via communication ports of the communication links 12. The processor 11 and the communication link 12 may be formed by a known processor and a known communication link, and a known processor node may be used for the processor nodes 1-1 through 1-N.

The switch controller 4 outputs control signals for controlling connection modes of the cluster switches 5-1 through 5-N, 6-1 through 6-N, 7-1a through 7-La, 7-1b through 7-Lb, 8-1a through 8-Ma and 8-1b through 8-(M−1)b. As will be described later, the cluster switches 5-1 through 5-N and 6-1 through 6-N respectively have five connection modes, and are controlled to one connection mode based on the control signal from the switch controller 4. In addition, the cluster switches 7-1a through 7-La, 7-1b through 7-Lb, 8-1a through 8-Ma and 8-1b through 8-(M−1)b respectively have three connection modes, and are controlled to one connection mode based on the control signal from the switch controller 4.

Figure 8:
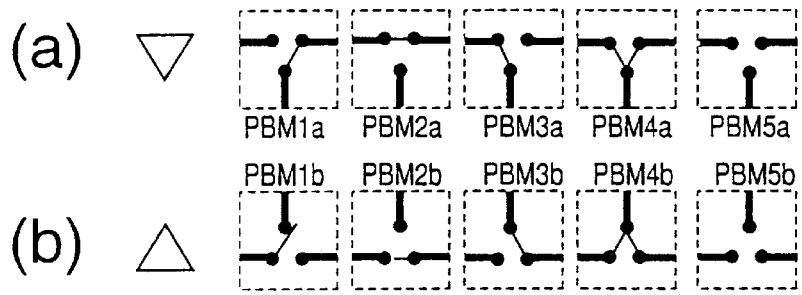
FIG. 8(a) and FIG. 8(b) are diagrams for explaining connection modes of a cluster switch for parallel buses.
Figure 9:
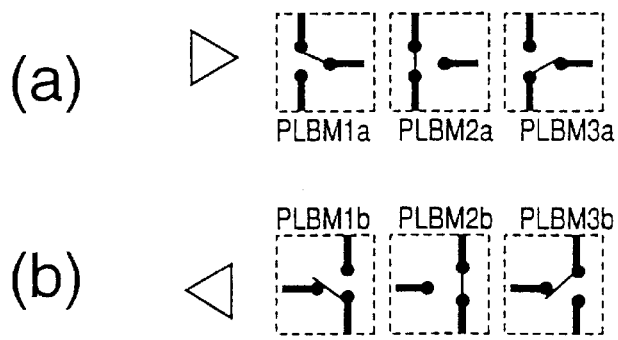
FIG. 9(a) and FIG. 9(b) are diagrams for explaining connection modes of cluster switches for pipeline buses.

FIG. 8(a) shows five connection modes PBM1a through PBM5a of the cluster switches 5-1 through 5-N for parallel buses, and FIG. 8(b) shows five connection modes PBM1b through PBM5b of the cluster switches 6-1 through 6-N for parallel buses. In addition, FIG. 9(a) shows three connection modes PLBM1a through PLBM3a of the cluster switches 7-1a through 7-La and 8-1a through 8-Ma for pipeline buses, and FIG. 9(b) shows three connection modes PLBM1b through PLBM3b of the cluster switches 7-1b through 7-Lb and 8-1b through 8-(M−1)b for pipeline buses.

The switch controller 4 centrally manages the connection modes of the cluster switches 5-1 through 5-N, 6-1 through 6-N, 7-1a through 7-La, 7-1b through 7-Lb, 8-1a through 8-Ma and 8-1b through 8-(M−1)b. Hence, the user can set in advance a connection structure which is suited for an application to be implemented, and execute the real application. The switch controller 4 may be realized by an electronic control using a microprocessor or the like, or by use of a physical switch structure.

In the case of the parallel processor system shown in FIG. 6, an input is possible with respect to both the parallel buses 2 and 3. In other words, an input IN1 is made with respect to the parallel bus 2, and an input IN2 is made with respect to the parallel bus 3. Furthermore, an output is possible from both the parallel buses 2 and 3 and from the pipeline bus 9 at the last stage. That is, an output OUT1 can be made from the parallel bus 2, an output OUT2 can be made from the pipeline bus 9 at the last stage, and an output OUT3 can be made from the parallel bus 3.

Figure 10:
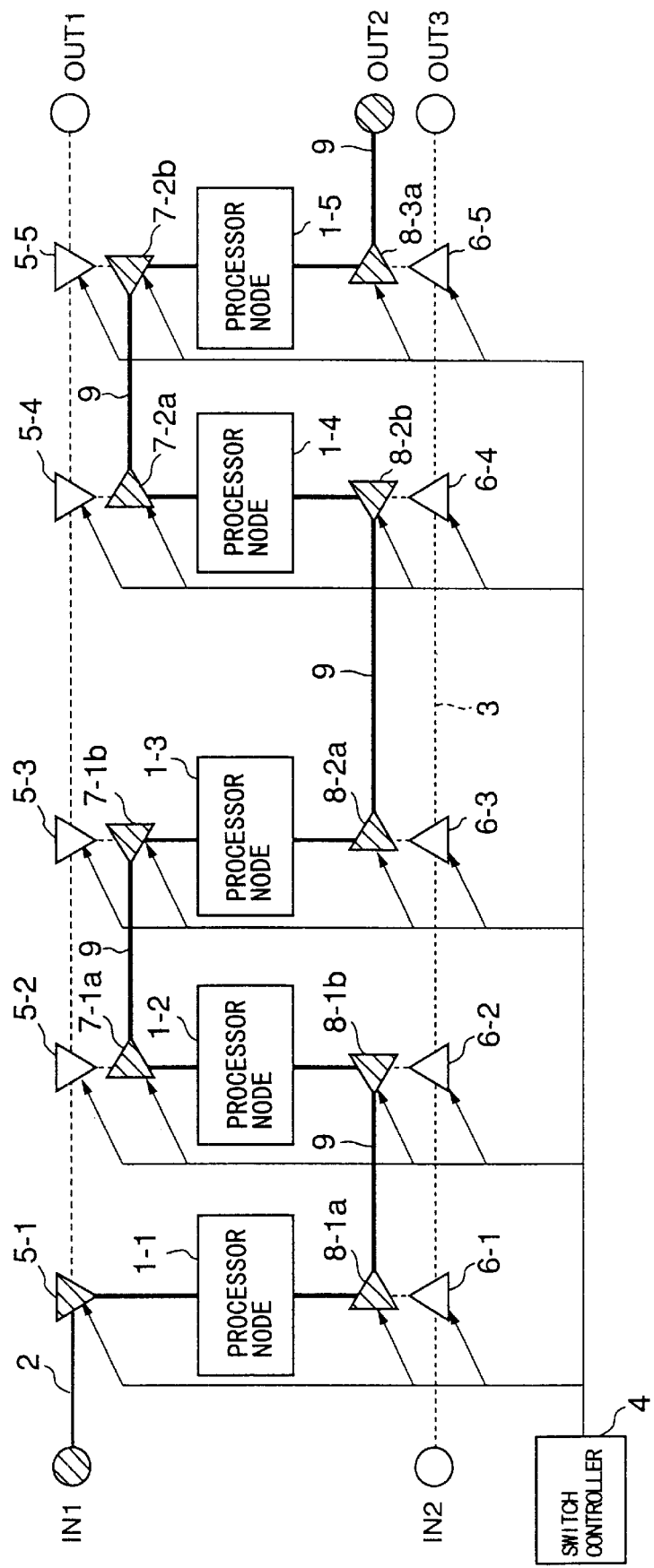
FIG. 10 is a diagram for explaining a pipeline process for a case where N=5.

Next, a description will be given of a case where N=5 and processes A through E are subjected to a pipeline process in this serial sequence by the processor nodes 1-1 through 1-5, by referring to FIG. 10. In FIG. 10, those parts which are the same as those corresponding parts in FIG. 6 are designated by the same reference numerals, and a description thereof will be omitted. In FIG. 10 and in the subsequent drawings which will be described later, a cluster switch shown without the hatching indicates the cluster switch in an OFF state, that is, in one of the connection modes PBM5a, PBM5b, PLBM2a and PLBM2b. On the other hand, a cluster switch shown with the hatching indicates the cluster switch in an ON state, that is, in one of the connection modes PBM1a through PBM4a, PBM1b through PBM4b, PLBM1a, PLBM3a, PLBM1b and PLBM3b. In addition, a bus which is not connected due to the OFF state of the cluster switch is indicated by a dotted line, and only the connected bus is indicated by a solid line.

In this case, the switch controller 4 outputs the control signals for controlling the cluster switch 5-1 to the connection mode PBM3a, the cluster switches 8-1a, 8-2a, 8-3a to the connection mode PLBM1a, the cluster switches 7-1a and 7-2a to the connection mode PLBM3a, the cluster switches 8-1b and 8-2b to the connection mode PLBM3b, and the cluster switches 7-1b and 7-2b to the connection mode PLBM1b. As a result, a mutual connection network in which the pipeline buses 9 are connected as shown in FIG. 10 is constructed. When the input IN1 is input to the parallel bus 2, the processes A through E are sequentially carried out, and the output OUT2 is output from the cluster switch 8-3a via the pipeline bus 9.

Figure 11:
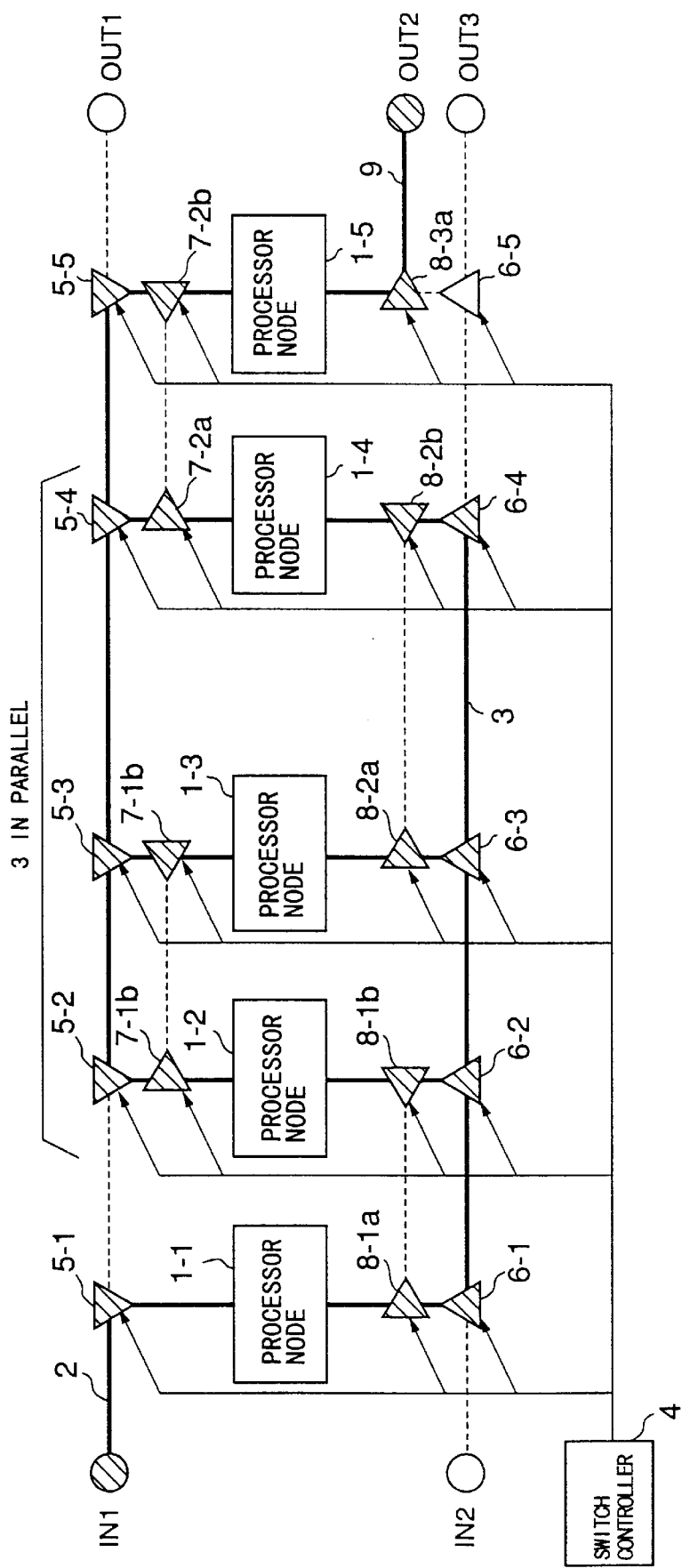
FIG. 11 is a diagram for explaining a parallel process for a case where N=5.

Next, a description will be given of a case where N=5 and processes A through C are subjected to a pipeline process in this serial sequence by the processor nodes 1-1 through 1-5, by referring to FIG. 11. In this case, it is assumed for the sake of convenience that a load of the process B is large, and that the process B is realized by carrying out processes B1 through B3 in parallel. In FIG. 11, those parts which are the same as those corresponding parts in FIG. 6 are designated by the same reference numerals, and a description thereof will be omitted.

In this case, the switch controller 4 outputs the control signals for controlling the cluster switches 5-1 and 5-5 to the connection mode PBM3a, the cluster switch 5-2 to the connection mode PBM1a, the cluster switches 5-3 and 5-4 to the connection mode PBM4a, the cluster switch 6-1 to the connection mode PBM3b, the cluster switches 6-2 and 6-3 to the connection mode PBM4b, the cluster switch 6-4 to the connection mode PBM1b, the cluster switches 8-1a, 7-1a, 8-2a and 7-2a to the connection mode PLBM2a, the cluster switch 8-3a to the connection mode PLBM1a, and the cluster switches 8-1b, 7-1b, 8-2b and 7-2b to the connection mode PLBM2b. As a result, a mutual connection network in which the pipeline buses 9 are connected as shown in FIG. 11 is constructed. When the input IN1 is input to the parallel bus 2, the process A, B (parallel processes B1 through B3) and C are sequentially carried out, and the output OUT2 is output from the cluster switch 8-3a via the pipeline bus 9.

Accordingly, this embodiment includes both the total connection type and the parallel bus type connection formats. More particularly, a plurality of communication ports of the processor nodes are grouped so as not to include communication ports from the same processor nodes, and parallel buses and pipeline buses are provided. The parallel buses connect the plurality of communication ports for each group, and the pipeline buses are capable of connecting the processor nodes in series by mutually connecting the communication ports independently of the parallel buses. In addition, a cluster switch for turning the connections ON and OFF is provided at nodes which connect the communication ports, the parallel buses and the pipeline buses, and the ON and OFF states of the cluster switch are set arbitrarily. As a result, when the processing performance of the processor nodes by themselves do not satisfy the required performance of the requested process, it is possible to utilize the parallel buses to develop the requested process into parallel processes, while maintaining the superior characteristics of the total connection type connection format.

In other words, when constructing a mutual connection network suited for carrying out encoding of audio and image data and signal processing on computer graphics and the like, the pipeline buses which connect each of the processor nodes in series are used to receive the input data from one communication port of the processor node and to output a processed result from another communication port after processing the input data in the processor node to be input to the next processor node, since the signal processing in this case is based on a pipeline process. On the other hand, when the processing performance of the processor nodes by themselves do not satisfy the required performance of the requested process, the parallel buses are used to develop the requested process into parallel processes, so that the requested process is distributed to and carried out by a plurality of processor nodes by scattering and gathering with a 1:n connection format. As a result, it is possible to construct a mutual connection network which can develop only a portion of the signal processing, having a large processing load, into parallel processes. That is, it is possible to realize a parallel processor system which can construct a mutual connection network with a high flexibility.

Accordingly, it is possible to realize a series connection of the processor nodes to suit a pipeline process while greatly reducing the hardware scale compared to the total connection type connection format, and to also realize parallel development of the process using the parallel buses having a small hardware scale. In other words, all combinations of pipeline processes and parallel processes required by a signal processing can be realized by arbitrarily controlling the cluster switches which control the connections of the two kinds of buses, namely, the pipeline buses and the parallel buses.

In this embodiment described heretofore, it is assumed for the sake of convenience that all of the processor nodes have the same structure. However, it is not essential for all of the processor nodes within the parallel processor system to have the same structure, and the parallel processor system may include two or more kinds of processor nodes having different structures.

Figure 12:
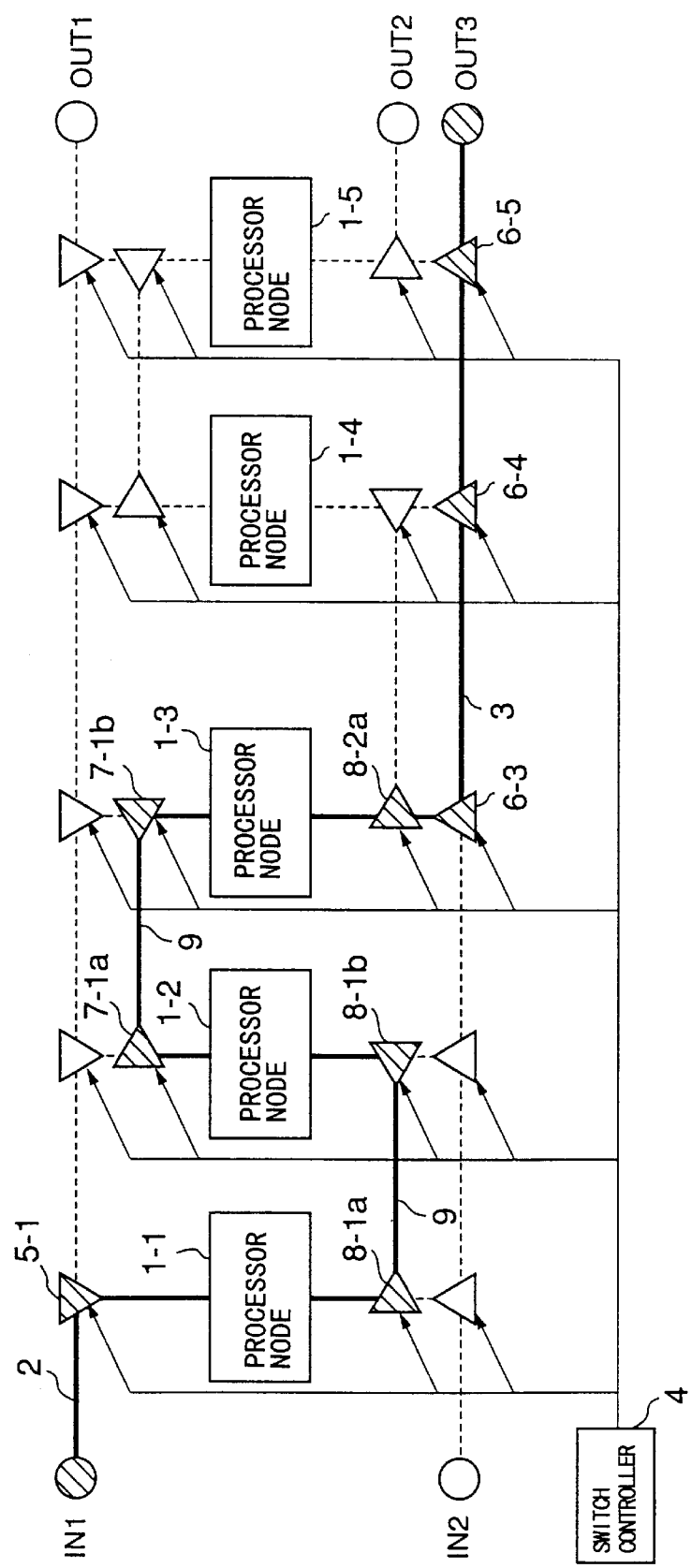
FIG. 12 is a diagram for explaining a case where processes A through C are carried out in the embodiment.

Next, a description will be given of various kinds of mutual connection networks realized by this embodiment, by referring to FIG. 12 and the subsequent drawings. In FIGS. 12, 14, 16, 18, 20, 22 and 24, those parts which are the same as those corresponding parts in FIGS. 6, 10 and 11 are designated by the same reference numerals, and a description thereof will be omitted.

In the case of the mutual connection network shown in FIG. 12, the switch controller 4 outputs the control signals for controlling the cluster switch 8-2a to the connection mode PLBM2a, and the cluster switches 6-3, 6-4 and 6-5 respectively to the connection modes PBM3b, PBM2b and PBM2b, unlike the case shown in FIG. 10. Hence, in this case, when the input IN1 is input to the parallel bus 2, the processes A through C are sequentially carried out, and the output OUT3 is output from the cluster switch 6-5 via the parallel bus 3.

Figure 13:
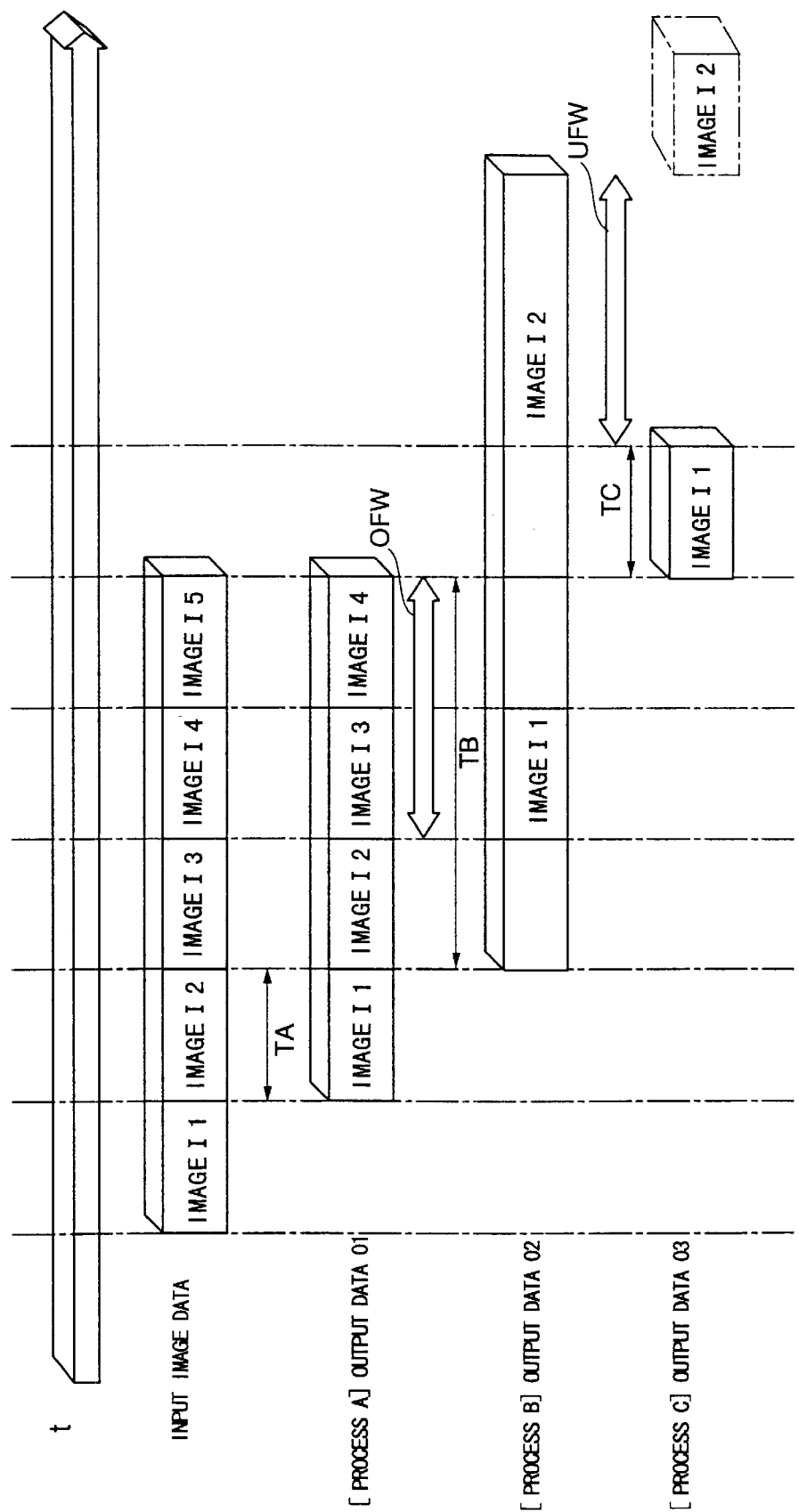
FIG. 13 is a time chart for explaining the case where the processes A through C are carried out in FIG. 12.

FIG. 13 is a time chart showing operation timings for this case. In FIG. 13, t denotes the time. With respect to an input image data including images I1 through I5, the processor node 1-1 outputs an output data 01 by carrying out the process A at a timing shown in FIG. 13. The processor node 1-2 carries out the process B with respect to the output data O1 of the processor node 1-1 at a timing shown in FIG. 13, and outputs an output data O2. In addition, the processor node 1-3 carries out the process C with respect to the output data O2 of the processor node 1-2 at a timing shown in FIG. 13, and outputs an output data O3. A processing time of the process A is denoted by TA, a processing time of the process B is denoted by TB, and a processing time of the process C is denoted by TC.

In this case, the input data with respect to the processor node 1-2 which carries out the process B overflows as indicated by OFW in FIG. 13, because a load of the process B happens to be large. On the other hand, the output data of the processor node 1-3 underflows as indicated by UFW in FIG. 13. For this reason, the process B should be developed into parallel processes in such a case.

Figure 14:
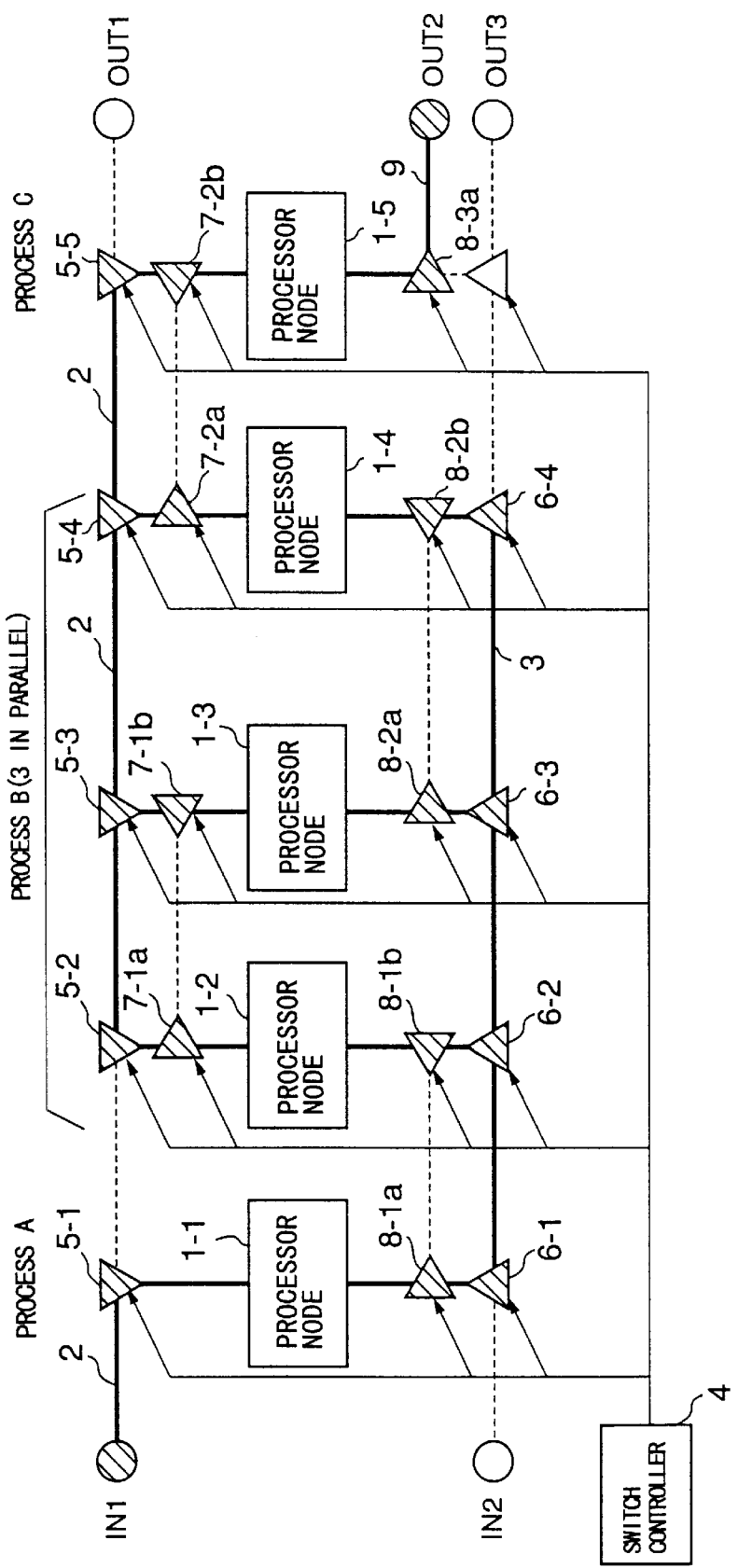
FIG. 14 is a diagram for explaining a case where processes A through C including parallel processes B1 through B3 are carried out in the embodiment.
Figure 15:
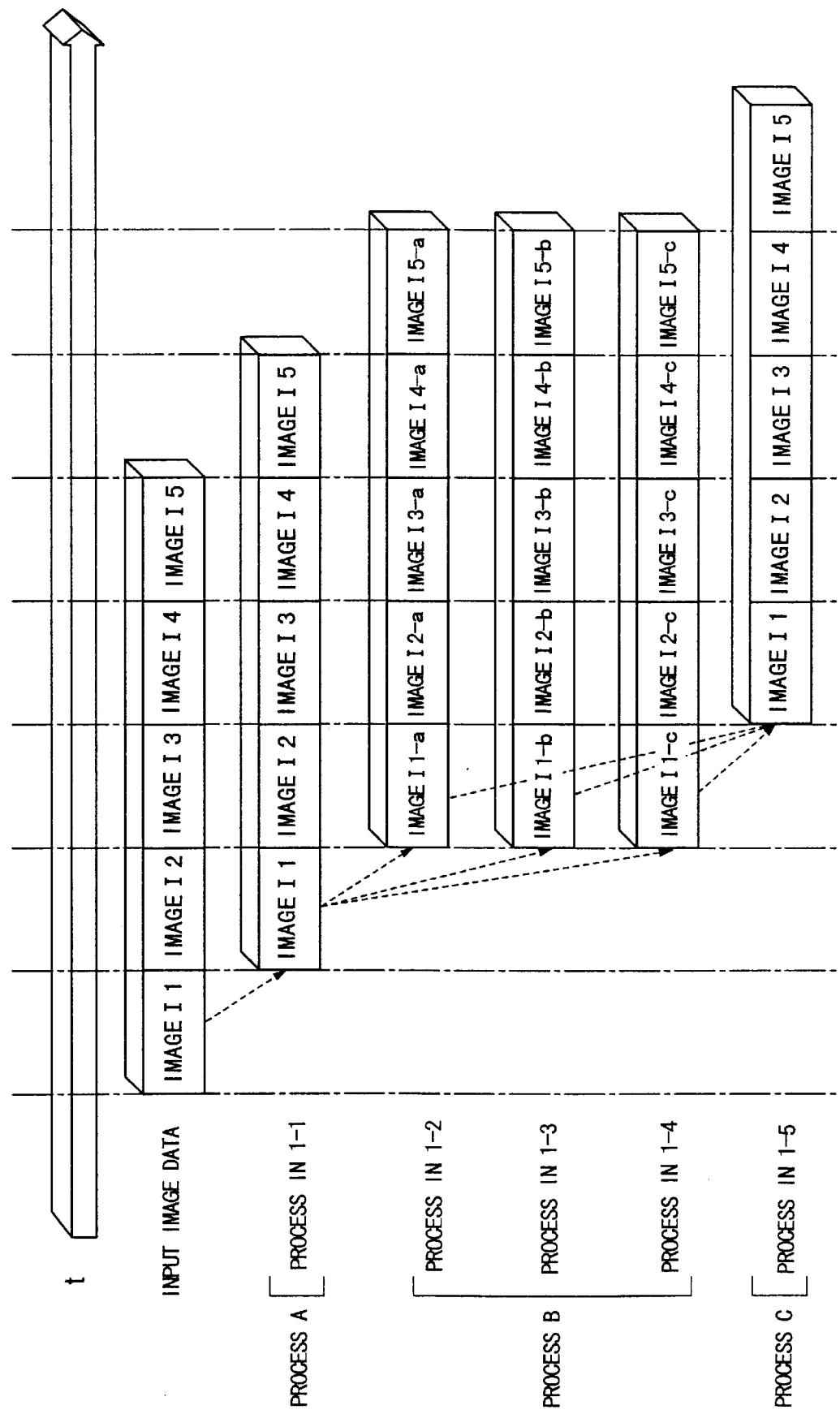
FIG. 15 is a time chart for explaining the case where the processes A through C are carried out in FIG. 14.

FIG. 14 shows a mutual connection network for developing the process B into such parallel processes, and the connections are the same as in FIG. 11. FIG. 15 is a time chart showing operation timings for this case. In FIG. 15, t denotes the time. With respect to the input image data including the images I1 through I5, the processor node 1-1 outputs an output data by carrying out the process A at a timing shown in FIG. 15. With respect to the output data of the processor node 1-1, the processor nodes 1-2 through 1-4 carry out the process B at timings shown in FIG. 15, and output output data. More particularly, the processor node 1-2 processes image portions I1-$a$ through I5-$a$ of the images I1 through I5, the processor node 1-3 processes image portions I1-$b$ through I5-$b$ of the images I1 through I5, and the processor node 1-4 processes image portions I1-$c$ through I5-$c$ of the images I1 through I5. In addition, with respect to the output data of the processor nodes 1-2 through 1-4, the processor node 1-5 outputs an output data by carrying out the process C at a timing shown in FIG. 15. In this case, by developing the process B into parallel processes, it is possible to improve the throughput of the processes A through C as a whole when the load of the process B is large, as compared to the case where the mutual connection network shown in FIG. 12 is used.

Figure 16:
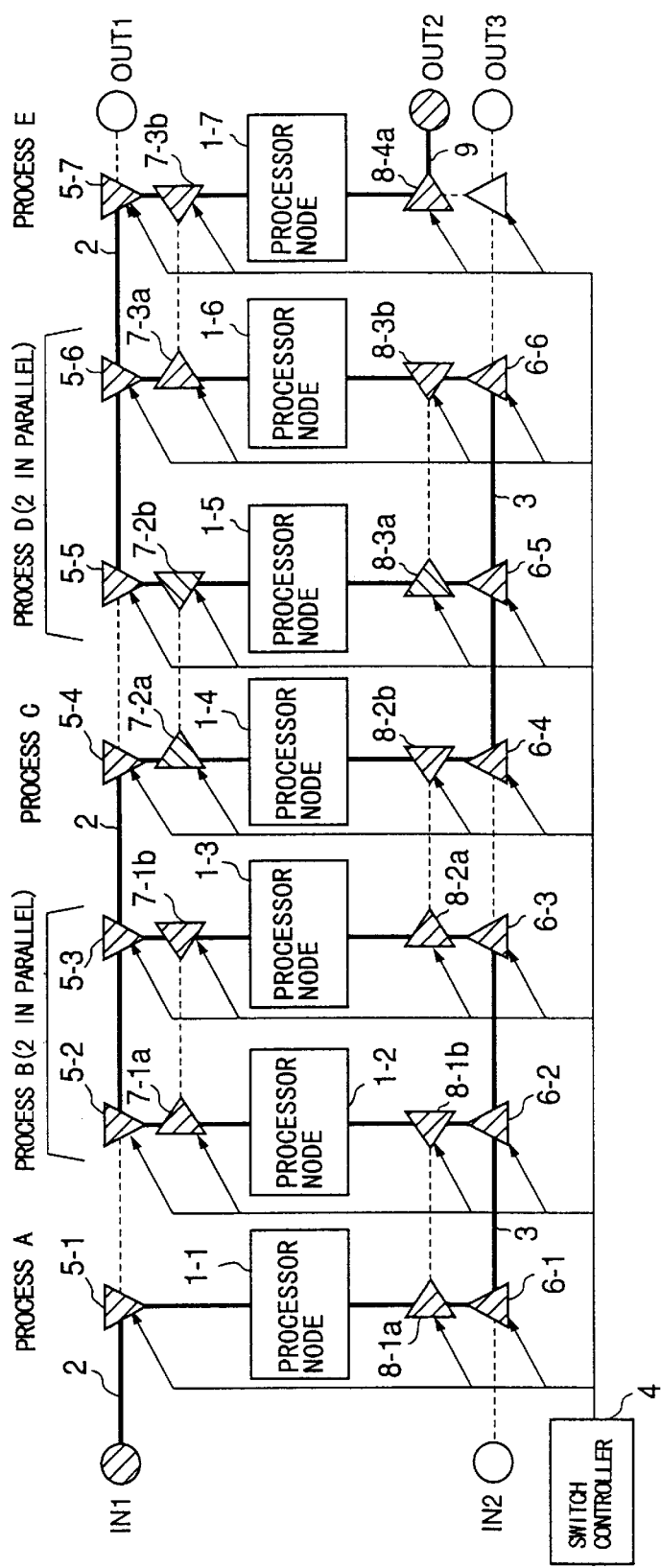
FIG. 16 is a diagram for explaining a case where processes A through E including parallel processes B1, B2, D1 and D2 are carried out in the embodiment.
Figure 17:
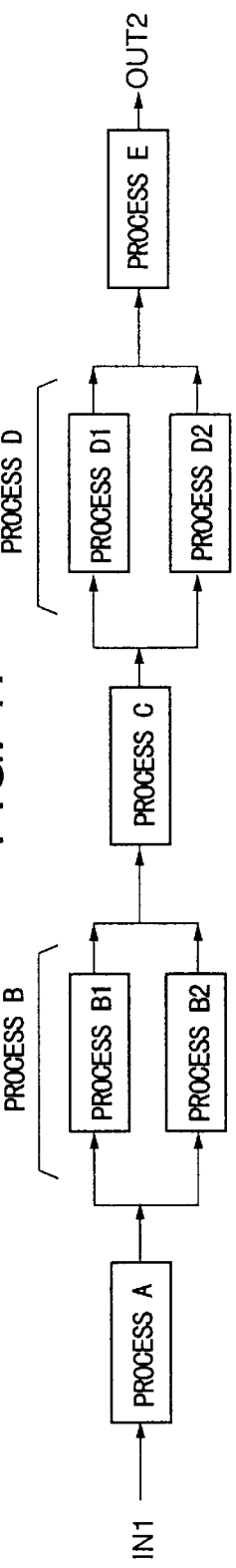
FIG. 17 is a diagram showing the processes A through E carried out by a mutual connection network shown in FIG. 16.

FIG. 16 is a diagram showing a mutual connection network for carrying out processes A through E shown in FIG. 17. By controlling each of the cluster switches by the switch controller 4 as shown in FIG. 16, the process A, the process B which is developed into parallel processes B1 and B2, the process C, the process D which is developed into parallel processes D1 and D2, and the process E are successively carried out with respect to the input IN1 which is input to the parallel bus 2. As a result, the output OUT2 is output from the cluster switch 8-4a via the pipeline bus 9.

Figure 18:
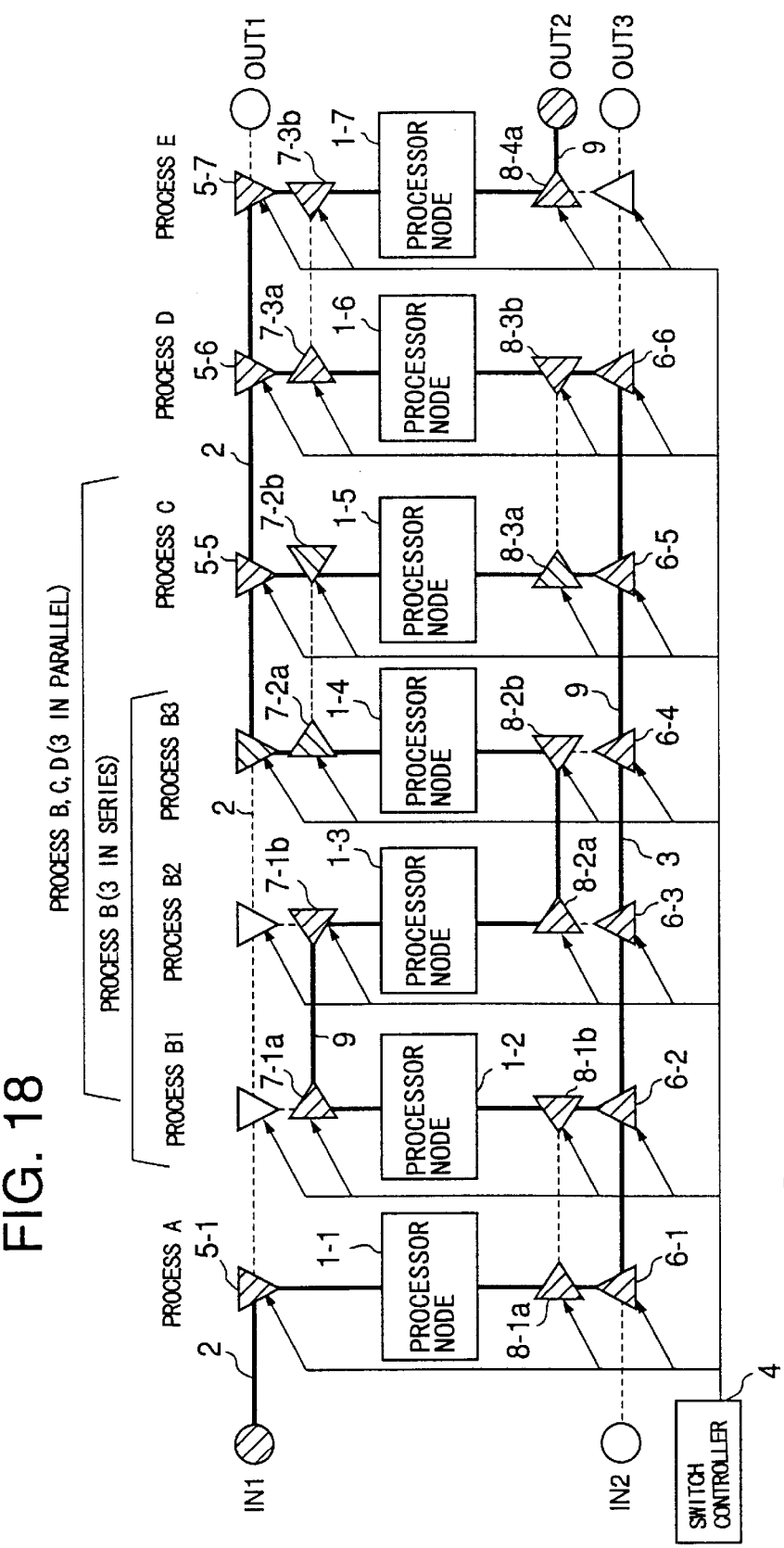
FIG. 18 is a diagram for explaining a case where processes A through E including parallel processes B through D are carried out in the embodiment.
Figure 19:
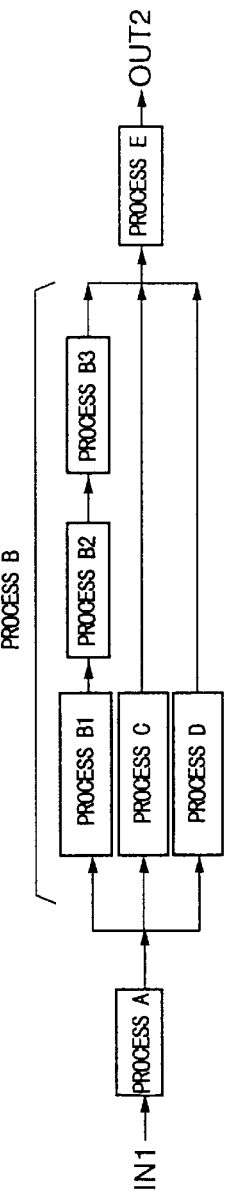
FIG. 19 is a diagram showing the processes A through E carried out by a mutual connection network shown in FIG. 18.

FIG. 18 is a diagram showing a mutual connection network for carrying out processes A through E shown in FIG. 19. By controlling each of the cluster switches by the switch controller 4 as shown in FIG. 18, the process A, the parallel processes B, C and D, and the process E are successively carried out with respect to the input IN1 which is input to the parallel bus 2. As a result, the output OUT2 is output from the cluster switch 8-4a via the pipeline bus 9. In this case, the process B is made up of pipeline processes B1 through B3.

Figure 20:
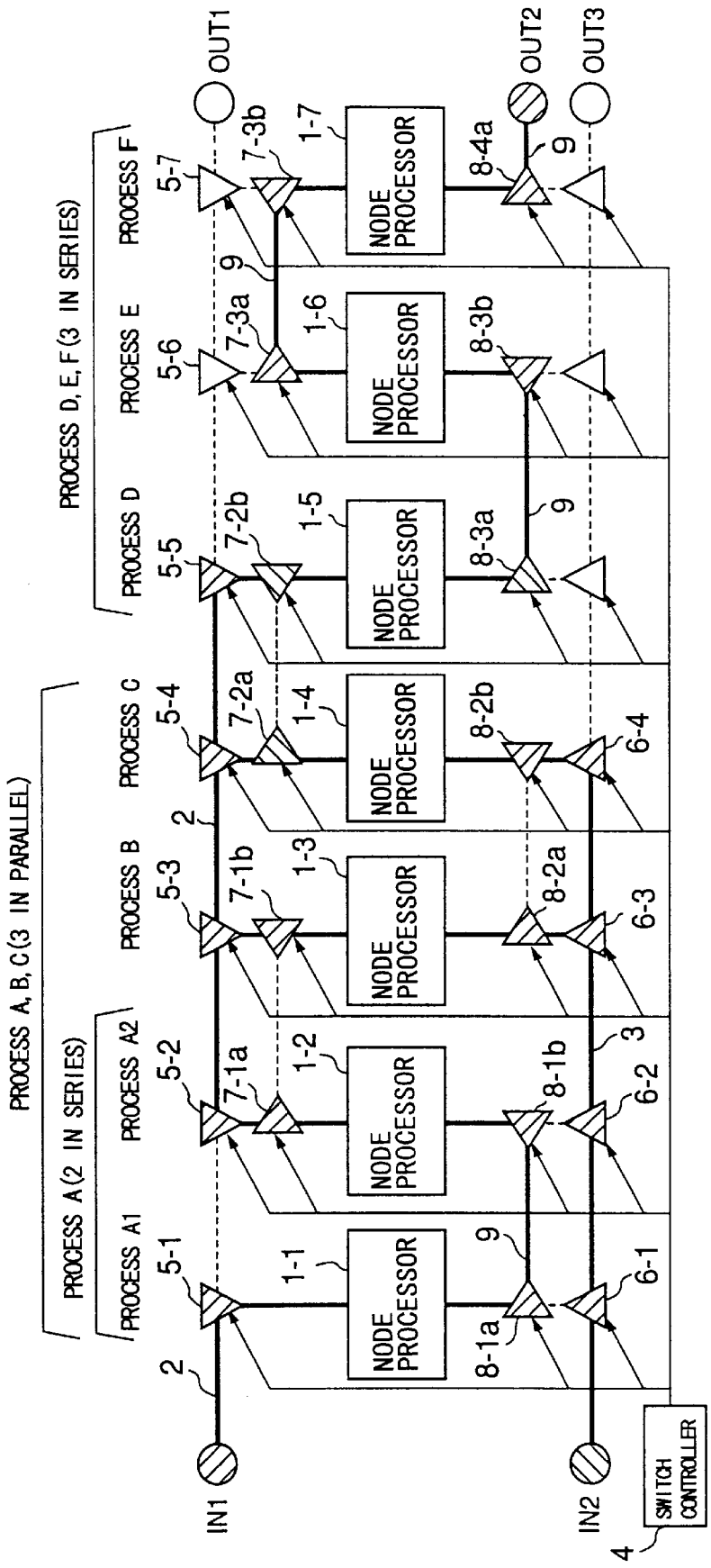
FIG. 20 is a diagram for explaining a case where processes A through F including parallel processes A through C are carried out in the embodiment.
Figure 21:
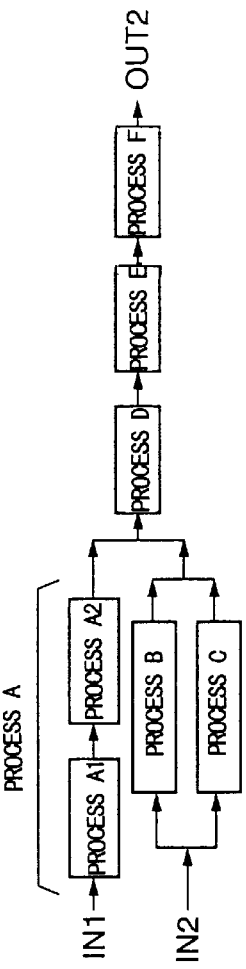
FIG. 21 is a diagram showing the processes A through F carried out by a mutual connection network shown in FIG. 20.

FIG. 20 is a diagram showing a mutual connection network for carrying out processes A through F shown in FIG. 21. By controlling each of the cluster switches by the switch controller 4 as shown in FIG. 20, the pipeline processes A1 and A2, and the processes D, E and F are successively carried out with respect to the input IN1 which is input to the parallel bus 2. Moreover, the parallel processes B and C, and the processes D, E and F are successively carried out with respect to the input IN2 which is input to the parallel bus 3. Therefore, the output OUT2 is output from the cluster 8-4a via the pipeline bus 9. In this case, the processes D, E and F are carried out with respect to the processed result of the pipeline processes A1 and A2 and the processed result of the processes B and C which are developed in parallel. Consequently, if the input IN1 is audio data and the input IN2 is image data, for example, it is possible to multiplex results of encoding processes carried out with respect to the inputs IN1 and IN2 to obtain a bit stream which is output as the output OUT2.

Figure 22:
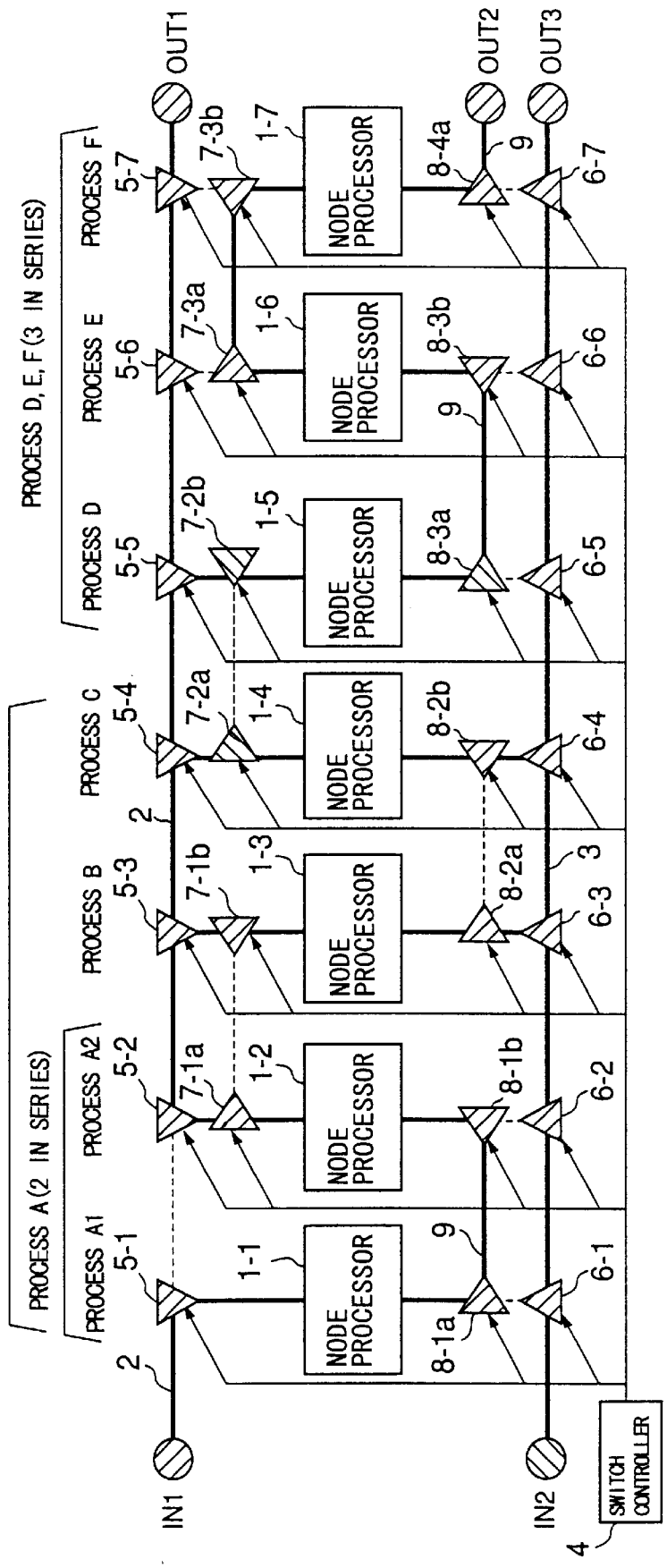
FIG. 22 is a diagram for explaining a case where processes A through F including parallel processes A through C are carried out in the embodiment.
Figure 23:
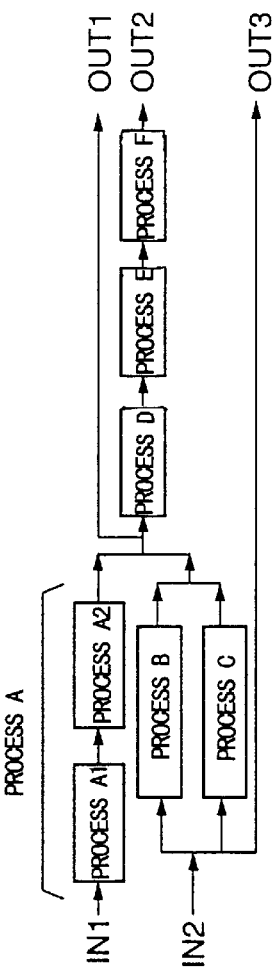
FIG. 23 is a diagram showing the processes A through F carried out by a mutual connection network shown in FIG. 22.

FIG. 22 is a diagram showing a mutual connection network for carrying out processes A through F shown in FIG. 23. By controlling each of the cluster switches by the switch controller 4 as shown in FIG. 22, the pipeline processes A1 and A2, and the processes D, E and F are successively carried out with respect to the input IN1 which is input to the parallel bus 2. In addition, the parallel processes B and C, and the processes D, E and F are successively carried out with respect to the input IN2 which is input to the parallel bus 3. In this case, the processes D, E and F are carried out with respect to the processed result of the pipeline processes A1 and A2, and with respect to the processed result of the processes B and C which are developed in parallel. Therefore, the output OUT2 is output from the cluster 8-4a via the pipeline bus 9. Moreover, the processed result of the pipeline processes A1 and A2 is output from the cluster switch 5-7 via the parallel bus 2, as the output OUT1. Furthermore, the input IN2 which is input to the parallel bus 3 is output from the cluster switch 6-7 via the parallel bus 3, as an output OUT3. Consequently, it is possible to arbitrarily output the input data and the intermediate results from a plurality of output ports.

Figure 24:
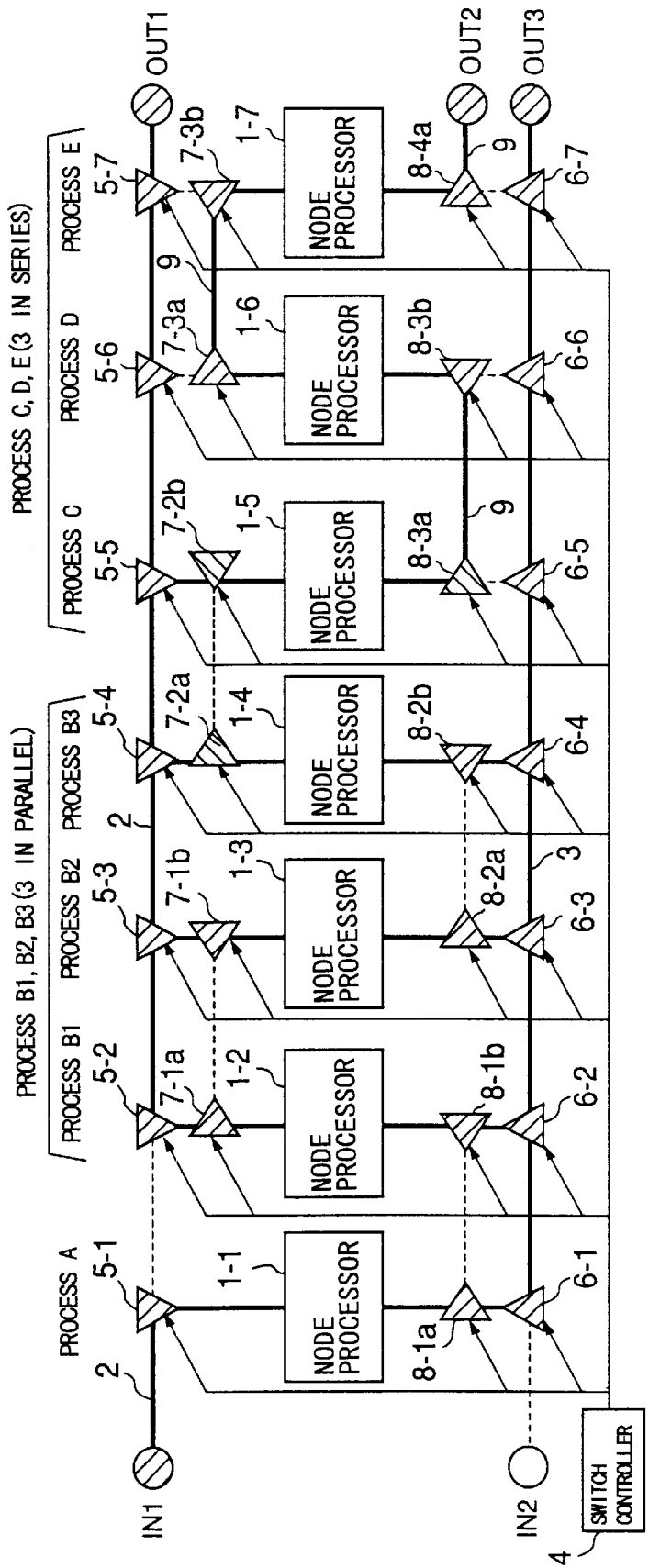
FIG. 24 is a diagram for explaining a case where processes A through E including parallel processes B1 through B3 are carried out in the embodiment.
Figure 25:
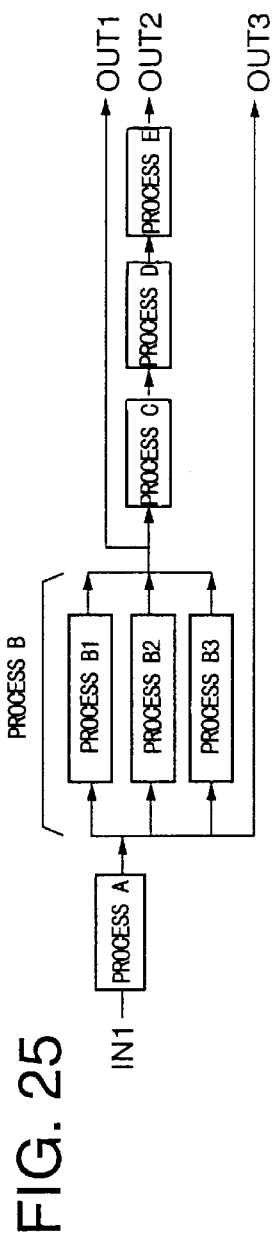
FIG. 25 is a diagram showing the processes A through E carried out by a mutual connection network shown in FIG. 24.

FIG. 24 is a diagram showing a mutual connection network for carrying out processes A through E shown in FIG. 25. By controlling each of the cluster switches by the switch controller 4 as shown in FIG. 24, the pipeline process A, the process B which is developed into parallel processes B1 through B3, and the processes C, D and E are successively carried out with respect to the input IN1 which is input to the parallel bus 2. In this case, the processes C, D and E are carried out with respect to the processed result of the processes B1 through B3 which are developed in parallel, and the output OUT2 is output from the cluster switch 8-4a via the pipeline bus 9. In addition, the processed result of the processes B1 through B3 which are developed in parallel is output from the cluster switch 5-7 via the parallel bus 2, as the output OUT1. Moreover, the processed result of the process A which is carried out with respect to the input IN1 is output from the cluster switch 6-7 via the parallel bus 3, as the output OUT3. Accordingly, it is possible to arbitrarily output the input data and the intermediate results from a plurality of output ports.

Further, the present invention is not limited to these embodiments, but various variations and modifications may be made without departing from the scope of the present invention.

What is claimed is:

1. A parallel processor system comprising:
   a pair of bi-directional parallel buses;
   a plurality of bi-directional pipeline buses;
   a plurality of processor nodes, each carrying out an operation process in response to an instruction and transferring data;
   a plurality of cluster switches, each having a plurality of connection modes and controlling connections of the parallel buses, the pipeline buses, and the processor nodes; and
   a switch controller controlling the connection mode of the cluster switches and coupling the processor nodes in series and/or in parallel.

2. The parallel processor system as claimed in claim 1, wherein said processor nodes are coupled between the parallel buses in parallel via the cluster switches, and said pipeline buses are coupled between paths which couple the parallel buses and the processor nodes, via the cluster switches.

3. The parallel processor system as claimed in claim 2, wherein said cluster switches which couple the parallel buses and the processor nodes include a first cluster switch having first through third ports and five connection modes, and a second cluster switch having first through third ports and three connection modes.

4. The parallel processor system as claimed in claim 3, wherein said first cluster switch has a connection mode for coupling the first and second ports thereof, a connection mode for coupling the second and third ports thereof, a connection mode for coupling the first and third ports thereof, a connection mode for coupling all of the first through third ports thereof, and a connection mode for releasing all of the first through third ports thereof.

5. The parallel processor system as claimed in claim 3 wherein said second cluster switch has a connection mode for coupling the second and third ports thereof, a connection mode for coupling the first and third ports thereof, and a connection mode for coupling the first and second ports thereof.

6. The parallel processor system as claimed in claim 1, wherein said switch controller is formed by an electronic control using a microprocessor or the like or by a physical switch structure.

7. The parallel processor system as claimed in claim 1, wherein said processor nodes include a processor which carries out the operation process in response to the instruction, and a bidirectional communication link which includes a plurality of communication ports and transfers the data based on a request from the processor.

8. The parallel processor system as claimed in claim 1, wherein said switch controller controls the cluster switches so that the processor nodes carry out processes with respect to one or a plurality of inputs which are input to the parallel buses, and output processed results via the parallel buses and/or the pipeline buses.

9. The parallel processor system as claimed in claim 4, wherein said second cluster switch has a connection mode for coupling the second and third ports thereof, a connection mode for coupling the first and third ports thereof, and a connection mode for coupling the first and second ports thereof.

10. The parallel processor system as claimed in claim 2, wherein said switch controller is formed by an electronic control using a microprocessor or the like or by a physical switch structure.

11. The parallel processor system as claimed in claim 3, wherein said switch controller is formed by an electronic control using a microprocessor or the like or by a physical switch structure.

12. The parallel processor system as claimed in claim 4, wherein said switch controller is formed by an electronic control using a microprocessor or the like or by a physical switch structure.

13. The parallel processor system as claimed in claim 5, wherein said switch controller is formed by an electronic control using a microprocessor or the like or by a physical switch structure.

14. The parallel processor system as claimed in claim 2, wherein said processor nodes include a processor which carries out the operation process in response to the instruction, and a bidirectional communication link which includes a plurality of communication ports and transfers the data based on a request from the processor.

15. The parallel processor system as claimed in claim 3, wherein said processor nodes include a processor which carries out the operation process in response to the instruction, and a bidirectional communication link which includes a plurality of communication ports and transfers the data based on a request from the processor.

16. The parallel processor system as claimed in claim 4, wherein said processor nodes include a processor which carries out the operation process in response to the instruction, and a bidirectional communication link which includes a plurality of communication ports and transfers the data based on a request from the processor.

17. The parallel processor system as claimed in claim 5, wherein said processor nodes include a processor which carries out the operation process in response to the instruction, and a bidirectional communication link which includes a plurality of communication ports and transfers the data based on a request from the processor.

18. The parallel processor system as claimed in claim 6, wherein said processor nodes include a processor which carries out the operation process in response to the instruction, and a bidirectional communication link which includes a plurality of communication ports and transfers the data based on a request from the processor.

19. The parallel processor system as claimed in claim 2, wherein said switch controller controls the cluster switches so that the processor nodes carry out processes with respect to one or a plurality of inputs which are input to the parallel buses, and output processed results via the parallel buses and/or the pipeline buses.

20. The parallel processor system as claimed in claim 3, wherein said switch controller controls the cluster switches so that the processor nodes carry out processes with respect to one or a plurality of inputs which are input to the parallel buses, and output processed results via the parallel buses and/or the pipeline buses.

21. The parallel processor system as claimed in claim 4, wherein said switch controller controls the cluster switches so that the processor nodes carry out processes with respect to one or a plurality of inputs which are input to the parallel buses, and output processed results via the parallel buses and/or the pipeline buses.

22. The parallel processor system as claimed in claim 5, wherein said switch controller controls the cluster switches so that the processor nodes carry out processes with respect to one or a plurality of inputs which are input to the parallel buses, and output processed results via the parallel buses and/or the pipeline buses.

23. The parallel processor system as claimed in claim 6, wherein said switch controller controls the cluster switches so that the processor nodes carry out processes with respect to one or a plurality of inputs which are input to the parallel buses, and output processed results via the parallel buses and/or the pipeline buses.

24. The parallel processor system as claimed in claim 7, wherein said switch controller controls the cluster switches so that the processor nodes carry out processes with respect to one or a plurality of inputs which are input to the parallel buses, and output processed results via the parallel buses and/or the pipeline buses.

* * * * *